United States Patent
Halén et al.

(10) Patent No.: US 8,539,525 B2
(45) Date of Patent: Sep. 17, 2013

(54) METHOD AND APPARATUS IN A MEDIA PLAYER

(75) Inventors: Joacim Halén, Sollentuna (SE); Andreas Fasbender, Aachen (DE); Ignacio Más Ivars, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 560 days.

(21) Appl. No.: 12/303,229

(22) PCT Filed: Dec. 21, 2006

(86) PCT No.: PCT/SE2006/001476
§ 371 (c)(1),
(2), (4) Date: Jul. 7, 2009

(87) PCT Pub. No.: WO2007/142564
PCT Pub. Date: Dec. 13, 2007

(65) Prior Publication Data
US 2009/0265746 A1    Oct. 22, 2009

Related U.S. Application Data

(60) Provisional application No. 60/803,724, filed on Jun. 2, 2006.

(51) Int. Cl.
*H04N 7/10*    (2006.01)
*H04N 7/173*    (2011.01)

(52) U.S. Cl.
USPC ............................. 725/34; 725/134

(58) Field of Classification Search
None
See application file for complete search history.

(56) References Cited

U.S. PATENT DOCUMENTS

| 6,985,188 | B1 * | 1/2006 | Hurst, Jr. | 348/553 |
|---|---|---|---|---|
| 2002/0120752 | A1 | 8/2002 | Logan et al. | |
| 2002/0133247 | A1 | 9/2002 | Smith et al. | |
| 2002/0184314 | A1 * | 12/2002 | Riise | 709/205 |
| 2002/0188943 | A1 | 12/2002 | Freeman et al. | |
| 2004/0244035 | A1 * | 12/2004 | Wright et al. | 725/32 |
| 2005/0204381 | A1 * | 9/2005 | Ludvig et al. | 725/34 |
| 2007/0113243 | A1 * | 5/2007 | Brey | 725/32 |
| 2007/0174125 | A1 * | 7/2007 | Poole et al. | 705/14 |
| 2007/0192812 | A1 * | 8/2007 | Pickens et al. | 725/94 |

FOREIGN PATENT DOCUMENTS

| WO | WO 01/39502 A1 | 5/2001 |
|---|---|---|
| WO | WO 2004/088659 A1 | 10/2004 |

* cited by examiner

*Primary Examiner* — Chris Parry

(57) ABSTRACT

A method and arrangement for switching between a common media stream and a selective media stream of a media session received in a media player including a media buffer entity. Media frames of either a common media stream or a selective media stream are received and buffered in the media buffer entity. A switch at the media buffer entity is then controlled so that the output of the media buffer entity is changed from delivering common media frames to delivering selective media frames, or vice versa, upon detecting a stream switching trigger frame in the received media frames.

10 Claims, 6 Drawing Sheets

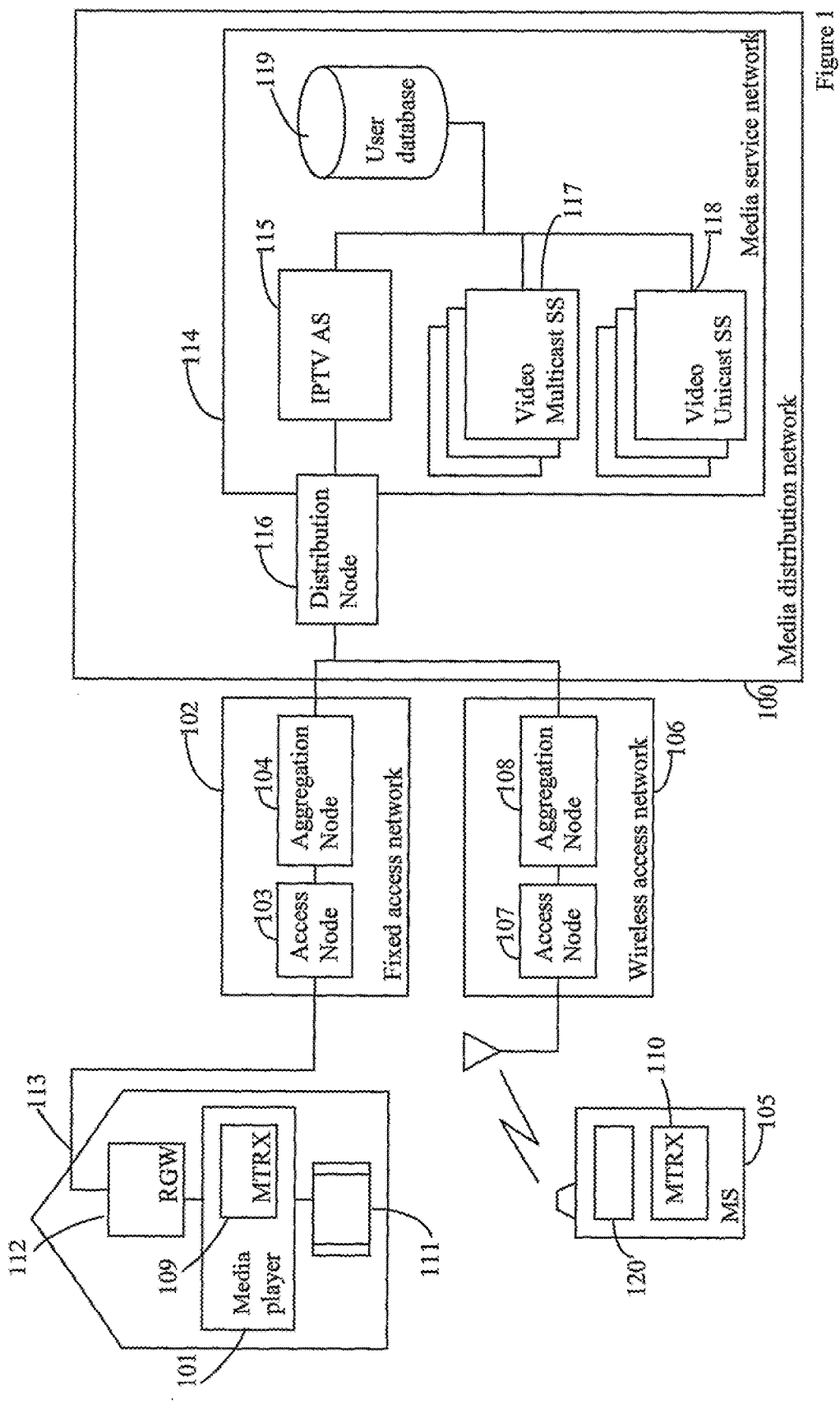

METHOD AND APPARATUS IN A MEDIA PLAYER

This application claims the benefit of U.S. Provisional Application No. 60/803,724, filed Jun. 2, 2006, the disclosure of which is fully incorporated herein by reference.

TECHNICAL FIELD

The present invention relates generally to the field of distributed IPTV media streams and, more particularly, the switching between different media streams received in a media player.

BACKGROUND

Today, more and more homes and private networks have an Internet connection through an IP (Internet Protocol) based broadband access network suitable for receiving content that requires higher bandwidth, for example TV, Video-On-Demand, and Internet radio. "IPTV" is a term for the technology used when delivering broadcasted TV services over an IP network. Due to the nature of IP-based transport in an IPTV content delivery system, content providers are able to deliver selective content streams to end users. In this context an "end user" is defined as the user of a media player, in which received content of the end user's choice is presented. Further, the term "media player" represents any apparatus capable of receiving and presenting media content, such as e.g. a set-top-box connected to a TV, an internet radio receiver, a PC or a cellular telephone.

The selective content streams may be personalized i.e. specifically adapted for individual end users or for specified groups of end users. For example, such streams can be used to customize a program according to the end user's interest e.g. a special version in terms of content or quality, or specific camera sources or angles in a sports or reality TV show, or to deliver selective advertisements, or any additional information. The latter feature is of increasing interest to content providers, as it enables delivery of advertisements that are selected for a target viewer group, and provides options to exploit end user interests via a feedback channel.

Selective streams can be delivered by means of unicast bearers or multicast bearers. In the former case the streams are individualized, while the latter case refers to customized channels allowing a content provider to deliver streaming content to groups of end users, e.g. car enthusiasts, sports fans, elderly people, or teenagers, either based on a user profile or through a subscription model, including these types of options. This is also applicable to services like pay-per-view (PPV) where, for example, a movie is "broadcasted" to a limited set of receiving media players at a specified time. When delivering selective streams, e.g. containing personalized advertisements, to the end users combined with common, broadcasted content (TV, PPV, radio), the following problems may arise.

When changing within a channel from a common media stream to a selective media stream, or vice versa, seamless switching between the different media streams is desired. The switching can be considered seamless if it is achieved without the viewer experiencing any disturbing and unwanted delay during the presentation of a streaming session. Therefore, adequate synchronisation of the delivery of the common (i.e. non-selective) media stream with the delivery of selective media streams must be maintained during a streaming session. Failure to provide such synchronisation may result in disturbing interruptions, as well as loss of information in the media reaching the media player.

Furthermore, it is desirable to optimise the bandwidth utilisation in the network, both for the network operator wanting to utilise the resources of an operating network as efficiently as possible, as well as for the end users wanting to save costs when subscribing for media services. Therefore, it is desirable to avoid any undue transmission of media.

In the normal distribution of TV programs, advertisements are distributed without any distinction within the channel being received. Furthermore, the normal TV distribution does not provide the possibility for end users to customize a TV program. One available way of delivering personalized media (e.g. personally directed advertisements) is to use different unicast channels, being received by different media players. However, there are a number of concrete technical problems associated with the existing solutions, which will be explained below.

During a streaming session, a selective unicast or multicast stream needs to be synchronised with a common media stream so that the receiving media player is able to change presentation mode, from distributing the common media stream to an appropriate selective stream, or vice versa. Such a situation may occur at the beginning of an advertisement break in a chosen media session. Since there may be end users not having selected any personalization at all, and who will thus only receive a default selective media stream during the break in the common media stream distribution, the channel content must be kept streaming continuously. This fact imposes an extra load to the access network, which needs to support two media streams destined to a particular end user's media player in order to provide the content for that media player. It is obvious that more bandwidth is generally required for each extra unicast channel being used.

The Internet Group Management Protocol (IGMP) is used to manage the membership of IP multicast groups. IGMP is used by IP hosts and adjacent multicast routers to establish multicast group memberships, also being an integral part of the IP multicast specification. The Real time Streaming Protocol (RTSP) is a client-server multimedia presentation control protocol, designed to control multimedia streams delivered, for example, via the Real Time Protocol (RTP), including absolute positioning within the media stream, recording and possibly media player control.

So called "Leave" and "Join" operations, which are based on the IGMP and RTSP protocols, are commonly utilised for media streams operations. One major disadvantage with these operations is that they cause disturbing delays in the media sessions. It is therefore generally desirable to avoid these operations as much as possible when distributing media sessions.

In order to save bandwidth when delivering a media stream, comprising an encoded motion sequence in a video or the like, to a media player, an encoding scheme, such as for example the well known MPEG-2, is commonly used. Such a stream includes individual frames of pictures which are grouped together as a group of pictures (GOP), for display in a media player so that the viewer registers the video's spatial motion. These frames are typically divided into B- and P-frames, where an I-frame is short for intraframe. An I-frame is a single frame of digital content that the compressor examines independent of the preceding and following frames and stores all of the data needed to display that frame. Typically, I-frames are interspersed with P-frames and B-frames in a compressed video. A B-frame is short for bi-directional frame, or bi-directional predictive frame. As the name suggests, B-frames rely on their preceding and following frames.

B-frames contain only the data that have changed from the preceding frame or are different from the data in the very next frame. A P-frame is short for predictive frame, or predicted frame. In a motion sequence, P-frames follow I-frames and contain only the data that have changed from the preceding I-frame (such as colour or content changes). Because of this, P-frames depend on the I-frames to fill in most of the data. In other words, the more I-frames occurring in the streams, the better quality of the video. However, I-frames contain the greatest amount of bits and therefore occupy more space on the storage medium or network bandwidth.

In order to achieve seamless switching between two media streams, the switch must be executed at a point in the network architecture where sufficient information can be retrieved in order to recover (decode) the original content. For example, switching seamlessly between two MPEG-2 encoded streams requires the switch to occur at a point where an I-frame, from which an entire picture can be generated, is present in the target media stream. Delays between successive I-frames can be in the order of seconds. The failure of the media player to discover a sent I-frame will therefore introduce disturbing delays to the streaming session.

The fact that the common media channel is still transmitted to the media player also after having switched to a selective media channel introduces another problem, as it imposes double bandwidth requirements on the access network. Thus, two media streams, i.e. the common media stream and one selective media stream, must be supported by the media player when tuned to receive the channel represented by the two streams. In addition, in a household or in a private network wherein a plurality of media players are tuned to different channels simultaneously, there is a need for even more bandwidth.

SUMMARY

The object of the present invention is to address at least some of the problems outlined above. More specifically, one object is to reduce any impact on the perceived quality when switching between different media streams distributed via a multimedia channel.

Another object is to reduce the bandwidth requirements on the access network as one or more media players receive media content.

These objects and others can be achieved primarily by a solution according to the appended independent claims.

According to different aspects, a method and an arrangement in a media player are defined for switching between a common media stream and a selective media stream of a media session received in the media player.

In the inventive method, media frames of either the common media stream or the selective media stream are received and buffered in a media buffer entity. Further, a switch at the media buffer entity is controlled so that the output of the media buffer entity is changed from delivering common media frames to delivering selective media frames, or vice versa, in response to a stream switching trigger frame in the received media frames.

The content of the delivered media frames can be converted at the media player and presented to an end user. The media player may be a set-top-box, a cellular telephone, an Internet Radio receiver, or a PC.

The output of the media buffer entity can be switched between a first media buffer and a second media buffer upon detection of the stream switching trigger frame on the output of the media buffer entity. Alternatively, the input of the media buffer entity is switched from the common media stream to the selective media stream, or vice versa, upon detection of the stream switching trigger frame on the input of the media buffer entity.

The selective media stream may be a default media stream or a personalized media stream. The selective media stream could then be received via a unicast bearer or a multicast bearer.

The inventive arrangement comprises a media buffer entity for receiving and buffering media frames. The media buffer entity includes a switching entity adapted to control a media switch so that the output of the media buffer entity changes from delivering common media stream frames to delivering selective media stream frames, or vice versa, in response to a stream switching trigger frame in the received media frames. The switching entity can be adapted to detect any stream switching trigger frame occurring in the received media frames.

The arrangement may further comprise means for converting the content of the delivered media frames and presenting the content to an end user.

When using the present invention, bandwidth can be saved in the network by having only one stream active at a time. Further, the impact on the perceived quality can be minimal since the switch between the buffered media streams will appear seamless at the media player. Further features and benefits of the present invention will become apparent from the detailed description below.

BRIEF DESCRIPTION OF THE DRAWINGS

The present invention will now be described in more detail by means of exemplary embodiments and with reference to the accompanying drawings, in which:

FIG. 1 is a block diagram illustrating an overview of a typical architecture of a media distribution network to which media players have access via a fixed access network and a wireless access network.

DETAILED DESCRIPTION

Figure 2A:
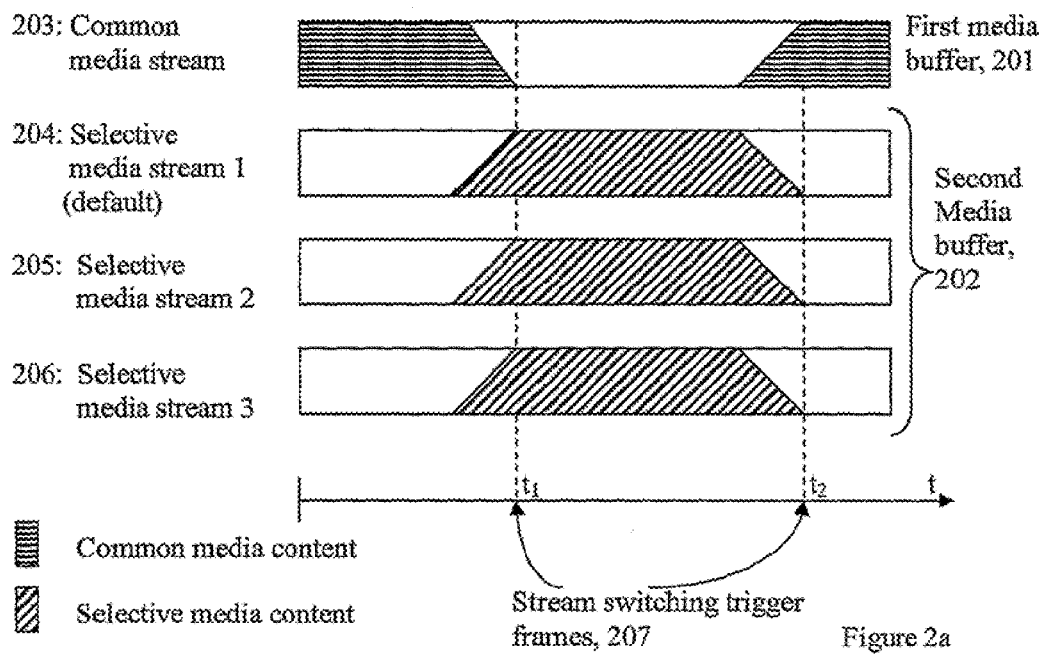
FIG. 2a illustrates how two media buffers of a media player are filled and drained during a streaming session, in accordance with a first embodiment.

Briefly described, the present invention provides a method and an arrangement in a media player for receiving media sessions involving a combination of broadcasted, multicasted and/or unicasted streams.

FIG. 1 shows an overview of an architecture for distributing IPTV services from a media distribution network 100 to which media players 101,105 have access. In FIG. 1, a stationary media player 101, e.g. a set-top-box, is connected to a fixed access network 102 comprising an access node 103 and an aggregation node 104. A mobile media player 105 is connected to the media distribution network 100 via a wireless access network 106, comprising an access node 107 and an aggregation node 108. For simplicity, this example only involves two media players being connected to the media distribution network 100 via different access networks. A media distribution network, however, normally provides access for a plurality of media players, and may also provide additional access networks. Basically, the present invention can be implemented in any of the shown media players 101, 105.

Each media player 101,105 comprises a Media Transmission/Reception Part (MTRX) 109 and 110, respectively, each of which may disclose functionality for reception of MPEG2 or MPEG4 streams and for conversion of such streams for delivery to a TV monitor 111 or a display 120, or any other apparatus adapted for presentation of the media content of a received streaming session to an end user. By connecting a Residential Gateway (RGW) 112 to the access network 102, two or more media players in a home or a private network may have access to the media distribution network 100 via the same connection link 113 attached to the access node 103 in access network 102.

Media streams are delivered to the media players 101,105 from a media service network 114, comprising one or more IPTV Application Servers (IPTV AS) 115 interacting between the media players 101,105 and other user devices, via a distribution node 116 on one side and IPTV streaming servers 117,118 of the service network 114 on the other side. In this example, the IPTV streaming servers 117,118 include one or more Video Multicast Streaming Servers (Video Multicast SS) 117 and one or more Video Unicast Streaming Servers (Video Unicast SS) 118. The IPTV Application Servers 115 may comprise functionality that controls personalization of services. The service network 114 also comprises at least one user database 119 for storing user profiles with individual streaming preferences.

An end user wanting to access a certain media service, tunes to a selected channel using a media player 101,105 e.g. a set-top box. Once the media player has been tuned, media streams are delivered to the media player via the selected channel and a streaming session is received, converted and presented to the end user. The conversion of received streaming content is executed in a conventional manner and, thus, this procedure will not be further explained in this document.

When using the present invention, each available channel contains two different streams, a common media stream and a selective media stream. The common media stream carries the common media content being broadcasted from a streaming server 117,118 of a service supplier, i.e. media content which may be received by any media player 101,105, which is tuned to the corresponding channel (e.g. a TV or radio program). The common media stream is usually transmitted over multicast, i.e. the stream is destined for a group of end users, although the stream can also be transmitted over unicast.

The streaming servers 117,118 further provide one or more selective media streams to the end users subscribing to the services of the respective streaming server 117,118 as an option to the common stream. Which selective media stream to be delivered to which media player and when, may be decided by the end user in real time via a control channel. Alternatively, this may be determined by the streaming server interrogating the end user's user profile in the user database 119. Consequently, if an end user has activated a personal profile, the selective media stream received at the end users media player may contain a personalized stream if certain predetermined conditions are fulfilled.

However, if no preferences are actively registered by the end user, the selective media stream to be forwarded to that end user during a break in the common media stream may be a default stream (e.g. default advertisements or a default angle of an extra camera covering a football match). For example, a default stream is distributed to all end users not having any personal preferences either registered in their user profiles or activated via the media players control channel. The streaming server may first check the user database 119 in this respect. The default stream may also be automatically distributed to any end user not having the option to chose from the selective media streams that are distributed from the sending streaming server 117,118.

The selective streams may be completely personal for a specific end user, i.e. unicasted, or personalized for a group of end users having a common profile of interest. In the latter case, the media stream is multicasted. As the end user tunes to a particular channel on a media player, the media player will start to receive either a common media stream or a selective media stream. Most of the time, media will be distributed on the common media stream and, thus, during these time intervals media content will arrive to the media player only on the common stream, i.e. the main program chosen by the end user is distributed to the respective media player. As long as the common stream contains content, the selective media stream of the respective channel will remain empty.

Transmission of content in the common media stream will continue until a break appears in the common stream. After the break, no more frames will be sent on the common media stream until a new break appears, this time in the selective media stream. At some point shortly before the break of the common media stream occurs, e.g. before a commercial break, the streaming server starts transmitting the selective media streams by activating the selected unicast and/or multicast stream according to information retrieved from the user database. The channel that consumed bandwidth for the distribution of one media stream in the prior art solution, now uses the same limited bandwidth for the delivery of two different media streams. In the present solution, a channel has streaming access to two streams simultaneously. However, since only one stream per channel is active at a time, the required bandwidth is reduced to half of what is necessary in the prior art solutions.

Two alternative embodiments for achieving an efficient utilisation of bandwidth resources and a simple yet effective switching operation between different streaming sessions will now be described with reference to FIGS. 2a-b, 3a-b and 4a-b, respectively.

FIG. 2a illustrates three alternative scenarios in a first embodiment where two media buffers 201,202 in a media player alternately receive two different media streams, one common media stream 203 and one selective media stream 204, 205 or 206, as a function of time. The figure illustrates an embodiment wherein a media player includes a media buffer entity having two individual media buffers including a first media buffer 201 and a second media buffer 202.

Initially, the first media buffer 201 of the media player is filled with common media content. Common media frames successively pass the first media buffer 201 before they are converted and presented to the end user. After a stream switching trigger frame 207, indicating a break in the common media stream, has occurred in the first media buffer 201, the first media buffer 201 is successively drained from common media frames, while the second media buffer 202 is successively filled with selective media frames of one of the selective media streams 204-206.

At the time $t_1$, a stream switching trigger frame 207 is detected at the output of the media player's media buffer entity, wherein the output is switched from the output of the first media buffer to the output of the second media buffer. At the time $t_2$, another stream switching trigger frame is detected at the output of the media buffer entity. This time, however, the output is switched from the output of the second media buffer to the output of the first media buffer.

Figure 3A:
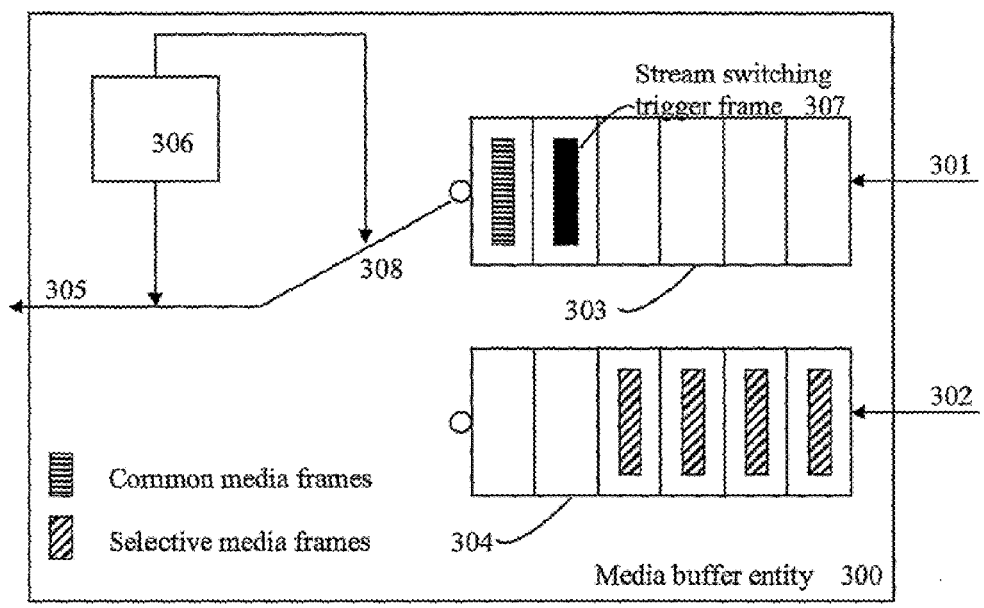
FIG. 3a is a block diagram illustrating two media buffers prior to the switching of the media buffer output of a media player, in accordance with the first embodiment.
Figure 3B:
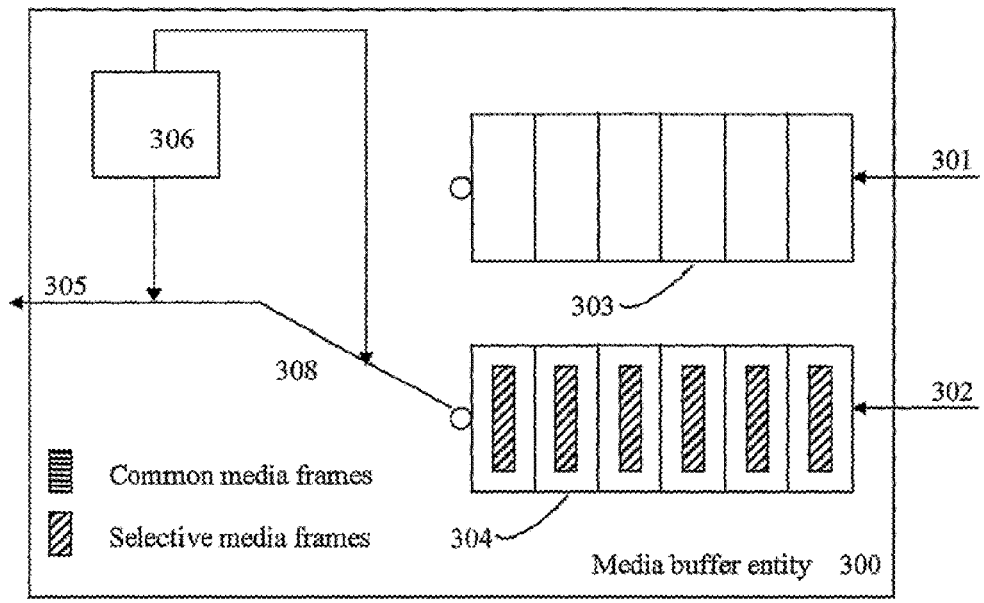
FIG. 3b illustrates the block diagram of FIG. 3a immediately after a switching has occurred.

The media buffer entity at $t_1$, i.e. just after said switching has occurred, is also illustrated in more detail in FIG. 3b, while FIG. 3a shows the media buffer entity at $t_1-2$, i.e. two frames before a stream switching trigger frame 207 is identified at the output of the media buffer entity. FIGS. 3a and 3b will be described in more detail below.

Referring again to FIG. 2a, if no selective media stream has been chosen by the end user, the selective media stream 1, being the default media stream, is distributed to the second media buffer 202. Otherwise, the preferred selective media stream, i.e. either media stream 1,2 or 3, is distributed to the second media buffer 202. Selective media content of the selected media stream is now successively passing through the second media buffer 202, forwarded via the media buffer output, converted and presented to the end user.

The presentation of selective media content continues until $t_2$, when a new stream switching trigger frame 207 is detected at the media player's buffer entity, this time in the selective media stream. As illustrated in the figure, the distribution of selective media frames is terminated prior to the occurrence of the stream switching trigger frame 207, while, at the same time, the distribution of common media frames to the first media buffer 201 has again been initiated, resulting in the first media buffer 201 being successively filled with common media frames.

Figure 2B:
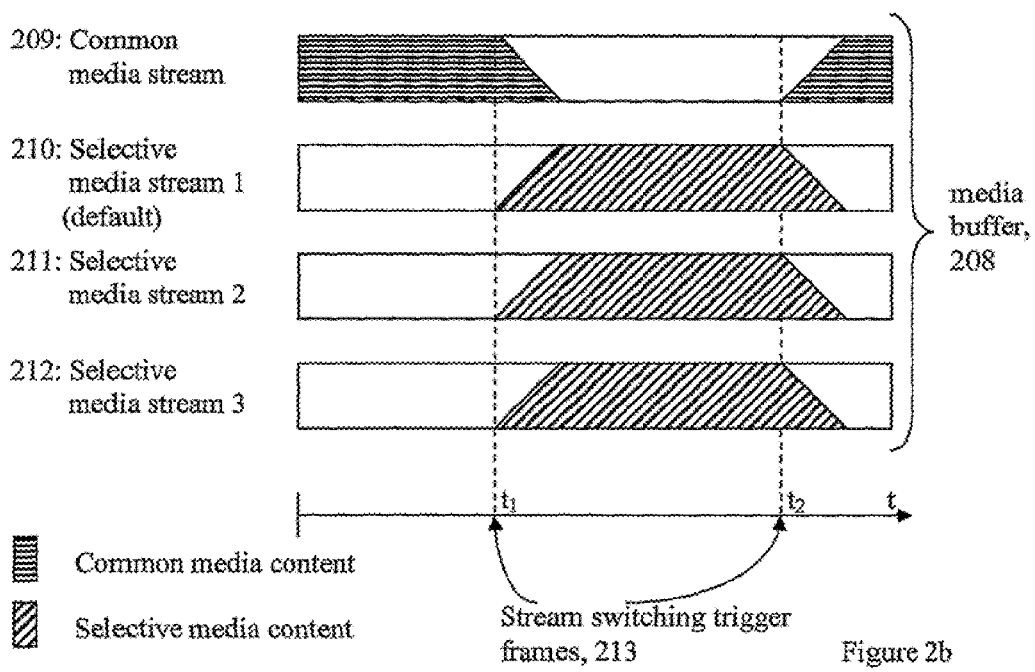
FIG. 2b illustrates how a single media buffer of a media player is filled and drained during a streaming session, in accordance with a second embodiment.
Figure 4A:
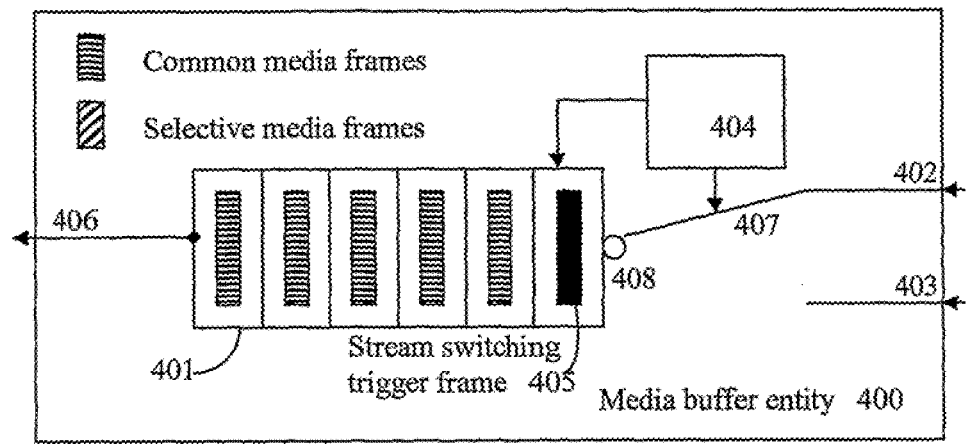
FIG. 4a is a block diagram illustrating a single media buffer prior to the switching of the input of the media buffer in accordance with the second embodiment.
Figure 4B:
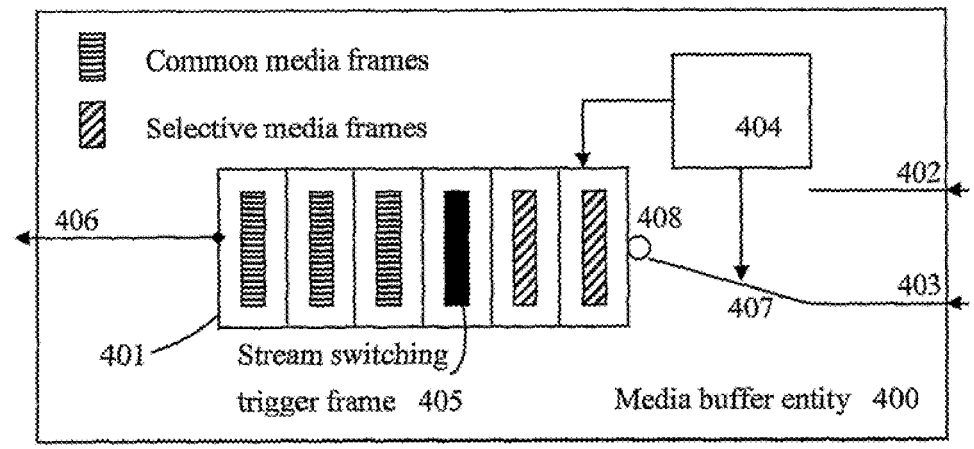
FIG. 4b illustrates the block diagram of FIG. 4a immediately after a switching has occurred.

FIG. 2b illustrates three alternative scenarios in a second embodiment, where one and the same media buffer 208 of a media player alternately receives frames from two different media streams, one common media stream, 209 and one selective media stream, 210, 211 or 212 as a function of time. In the second embodiment, a switching entity monitors the frames being delivered to the media buffer 208 for a stream switching trigger frame 213 on the input of the media buffer entity. Also in this embodiment, the occurrence of two stream switching trigger frames are indicated, one at $t_1$, and another one at $t_2$. The media buffer entity at $t_1$, i.e. when the stream switching trigger frame has just entered the media buffer 208, is also illustrated in FIG. 4a, while FIG. 4b shows the media buffer entity at $t_1+2$, i.e., two frames after a switching has occurred in the media buffer entity. Both figures will be described in further detail below.

As illustrated in FIG. 3b, selective media frames starts to fill the media buffer 208 immediately after a stream switching trigger frame 213 has occurred on the input of the media buffer 208. The transition between the common media stream and the chosen selective media stream, however, will be experienced in basically the same manner by the end user of the media player in both embodiments.

FIG. 3a shows a first embodiment of a media buffer entity 300 of a media player, which is receiving a streaming session, containing a common media stream 301 and a selective media stream 302 in accordance with any of the scenarios described with reference to FIG. 2a. In particular, FIG. 3a illustrates a media buffer entity at $t_1$, as indicated in FIG. 2a. In order to smoothen out the transition between different streams, the streams are buffered in two separate media buffers, a first media buffer 303 and a second media buffer 304. For illustrative purposes the media buffers in this example have a capacity of 6 frames. The media buffers 303,304, however, may have any other appropriate size. A switching entity 306 controls a media switch 308 for switching the output 305 of the media buffer entity 300, from which media frames are distributed to the user interface of the media player for presentation, is selectively switched to any of the outputs of the media buffers 303,304. The switching entity 306 monitors the frames being distributed to the output 305 in order to detect the occurrence of a stream switching trigger frame 307. The figure shows the content of the media buffers 303,304 as the first media buffer 303 is about to be drained and prior to the stream switching trigger frame 307 having reached the media buffer entity output 305. At this instance of time of FIG. 3a, one common media frame and a stream switching trigger frame 307 remain in the first media buffer 303. Parallel to the draining of the first media buffer 303, the second media buffer 304, is successively being filled with selective media frames. At this point, four selective frames have arrived in media buffer 304.

FIG. 3b illustrates the media buffer situation when the stream switching trigger frame has reached the media buffer entity output 305, or at $t_1+2$, i.e. two frames after the situation presented in FIG. 3a. When the stream switching trigger frame 307 is detected at the media buffer entity output 305 by the switching entity 306, the media buffer entity output 305 is switched from the first media buffer 303 to the second media buffer 304. The second media buffer 304, now being filled with selective media frames, will continue to deliver frames to the media buffer entity output 305 until a stream switching trigger frame 307 is again detected by the switching entity 306, and a new switching procedure is executed.

According to the embodiment of FIGS. 3a and 3b, only one stream at a time arrives to the media player, i.e., either the common content, arriving via the common media stream 301, or the default or personalized content, arriving via the selective media stream 302.

FIGS. 4a and 4b show an alternative embodiment of a media buffer entity 400 of a media player in accordance 10 with any of the scenarios described with reference to FIG. 2b, and especially in the vicinity of t 1 as indicated in FIG. 2b, wherein the media buffer entity 400 only comprises a single media buffer 401, which is used for both the common media stream 402 and the selective media stream 15 403. The media buffer entity 400 has a switching entity 404 located on the input 408 of the media buffer entity 400, which controls a media switch 407 for selectively switching the input of the single media buffer 401 to either the common media stream 402 or the selective media stream 403 of the channel chosen for the 20 respective media player, when a stream switching trigger frame 405 reaches the first position of the media buffer 401. Alternatively, the switching entity 404 could be monitoring both incoming streams 402,403 for stream switching trigger frames 405, detecting the frames before 25 they enter the buffer entity. When the stream switching trigger frame 405 is detected by the switching entity 404, the media buffer 401 is filled with common media frames, which are successively delivered to the media buffer entity output 406. FIG. 3a illustrates the situation just prior 30 to the media switch 308 being switched to its alternative position, wherein the input of the media buffer 401 is about to be connected to the selective media stream 403.

FIG. 4b illustrates the content of the media buffer 401 at $t_1+2$, i.e. two frames after the media buffer input has been switched from the common media stream 402 to the selective media stream 403 by the switching entity 404. The media buffer 401 will successively be drained from remaining common media frames, and a stream switching trigger frame 405 terminates the common media stream. After the switching, the media buffer 401 is successively filled with selective media frames, which are delivered to the media buffer entity output 406 for conversion and presentation to the end user. The selective stream is received in the media player and presented to the end user until a new stream switching trigger frame 405 arrives at the media buffer 401. The media buffer input 408 is now switched back to the common media stream 402, and the buffer again receives common media content.

Figure 5:
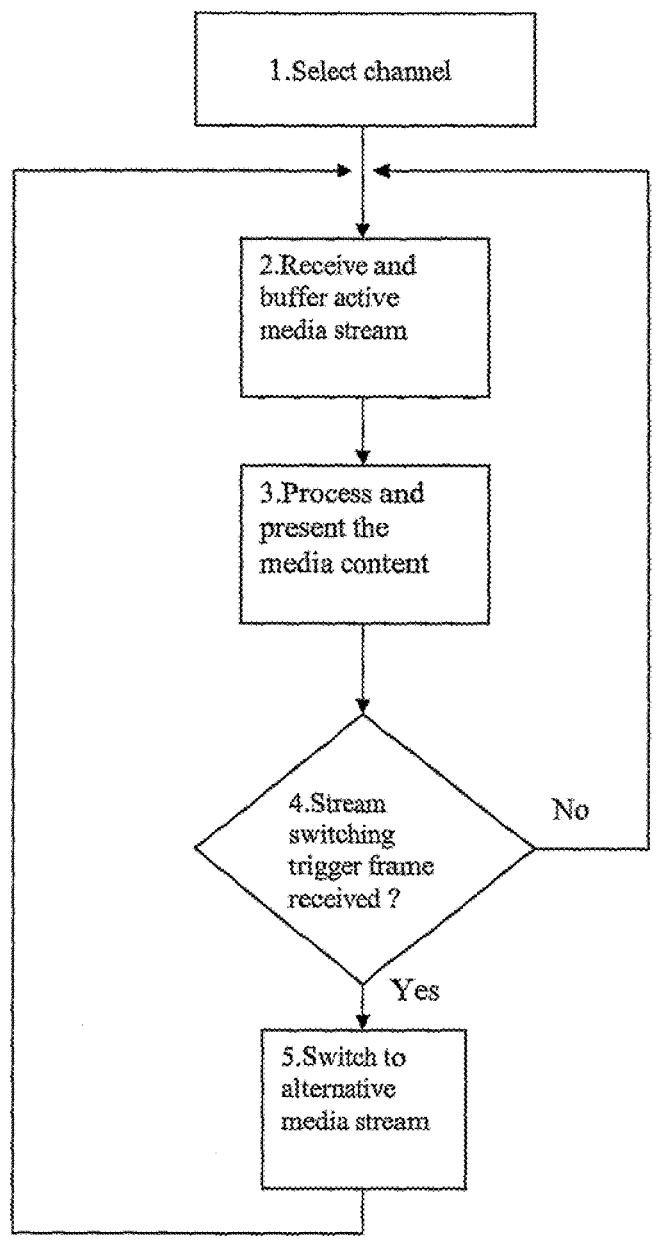
FIG. 5 is a flowchart illustrating a seamless switching procedure, according to another embodiment.

FIG. 5 illustrates a flow chart of a method for achieving seamless switching between a common media stream and a selective media stream, or vice versa, according to another embodiment. At step 1, an end user selects a channel for reception of a preferred media session on a media player. At step 2, an active stream is received on the input of a buffer entity of a media player. Frames arriving via the active stream are buffered in the media player's buffer entity. At step 3, the buffered stream content is converted and presented to the end user of the media player. At step 4, the media stream, which is presently received at the media player, is monitored to detect the occurrence of a stream switching trigger frame, and when such a trigger frame is detected, a switch is activated in the buffer entity of the media player (step 5), resulting in the buffering of the alternate media stream. As a result from the switching, the media content on the output of the media players buffer entity changes from the common media content to a selective media content, or vice versa. After this step, the process continues at step 2, and the monitoring and switching process is repeated.

Figure 6:
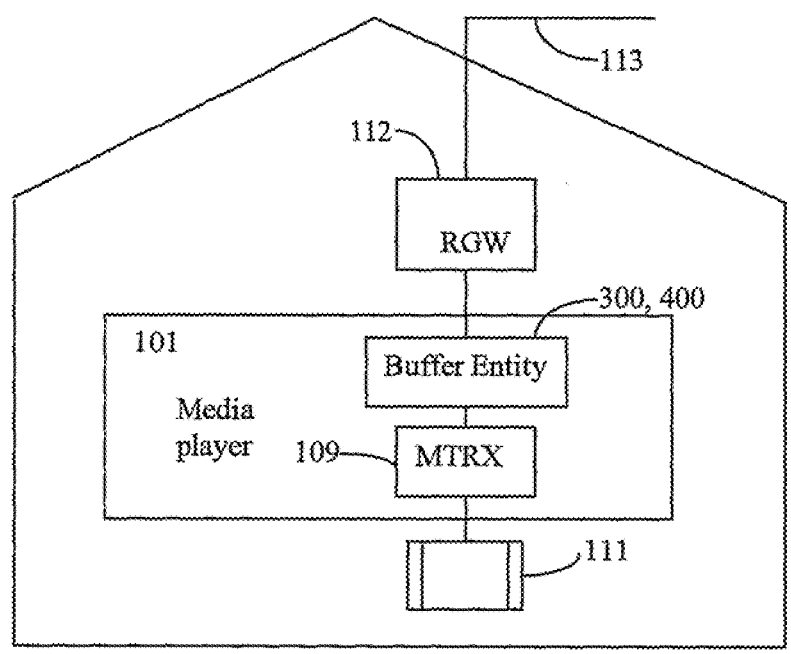
FIG. 6 is a block diagram illustrating a buffer entity according to any of the embodiments shown in FIGS. 2a-4b, when implemented in a media player.

FIG. 6 illustrates how any of the two alternative buffer entities according to any of the presented embodiments may be implemented in a media player. The figure shows a media player 101, i.e. a set-top-box, which is connected to an access network, i.e. a fixed access network, via a residential gateway 112 in accordance with what has previously been described with reference to FIG. 1. The buffer entity 300,400 is connected, preferably as an integrated unit, on the input of the media player. The output of the buffer entity is connected to a Media Transmission/Reception part (MTRX) 109 for conversion of buffered streams. From the MTRX, a stream is delivery to a monitor 111, e.g. a TV screen for presentation to an end user.

While the invention has been described with reference to specific exemplary embodiments, the description is generally only intended to illustrate the inventive concept and should not be taken as limiting the scope of the invention, which is defined by the appended claims.

The invention claimed is:

1. A method of switching between a common media stream and a selective media stream of a media session received in a media player, comprising the following steps executed in said media player:
   Receiving current media frames of either said common media stream or said selective media stream,
   Buffering the received media frames in a media buffer entity comprising a first media buffer for buffering said common media stream frames and a second media buffer for buffering said selective media stream frames, and
   Controlling a switch at the media buffer entity, wherein the received stream of current media frames is switched, and wherein output of the media buffer entity is changed from delivering common media frames from the first media buffer to delivering selective media frames from the second media buffer, or vice versa, in response to a stream switching trigger frame in one of the received media frames, wherein said stream switching trigger frame is the last frame in one of the first media buffer and second media buffer from which the common media frames are currently delivered.

2. A method according to claim 1, comprising the additional step:
   Converting at the media player content of the delivered media frames and presenting the content to an end user, wherein the media player is one of a set-top-box, a cellular telephone, an Internet Radio receiver, or a PC.

3. A method according to claim 1, wherein the output of the media buffer entity is switched between the first media buffer and the second media buffer upon detection of said stream switching trigger frame on the output of the media buffer entity.

4. A method according to claim 1, wherein the selective media stream is a default media stream or a personalized media stream.

5. A method according to claim 4, wherein the selective media stream is received via a unicast bearer or a multicast bearer.

6. An arrangement in a media player, for switching between a common media stream and a selective media stream of a received media session, comprising:
   a media buffer entity for receiving and buffering media frames, wherein the media buffer entity comprises a first media buffer for buffering said common media stream frames and a second media buffer for buffering said selective media stream frames,
   the media buffer entity having a switching entity adapted to control a media switch so that a media stream in the received media session is switched, and that output of the media buffer entity changes from delivering common media stream frames from the first media buffer to delivering selective media stream frames from the second media buffer, or vice versa, in response to a stream switching trigger frame in one of the received media frames, wherein said stream switching trigger frame is the last frame in one of the first media buffer and second media buffer from which the common media frames are currently delivered.

7. An arrangement according to claim 6, wherein the switching entity is adapted to detect any stream switching trigger frame occurring in the received media frames.

8. An arrangement according to claim 6, wherein the media player is configured for converting content of the delivered media frames and presenting the content to an end user.

9. An arrangement according to claim 6, wherein the switching entity is adapted to switch the output of the media buffer entity between the first media buffer and the second media buffer upon detection of said stream switching trigger frame on the output of the media buffer entity.

10. An arrangement according to claim 6, wherein the media player is one of a set-top-box, a cellular telephone, an Internet radio receiver, or a PC.

* * * * *